(12) United States Patent
Pilloud et al.

(10) Patent No.: US 11,792,537 B2
(45) Date of Patent: Oct. 17, 2023

(54) MULTI-CAMERA IMAGING SYSTEM USING A LASER LINE

(71) Applicant: BOBST MEX SA, Mex (CH)

(72) Inventors: Francis Pilloud, Clarens (CH); Pablo Antolinez, Ferney-Voltaire (FR); Olivier Porret, Lussery-Villars (CH)

(73) Assignee: BOBST MEX SA, Mex (CH)

( * ) Notice: Subject to any disclaimer, the term of this patent is extended or adjusted under 35 U.S.C. 154(b) by 267 days.

(21) Appl. No.: 17/593,327

(22) PCT Filed: Mar. 18, 2020

(86) PCT No.: PCT/EP2020/025136
§ 371 (c)(1),
(2) Date: Sep. 15, 2021

(87) PCT Pub. No.: WO2020/187454
PCT Pub. Date: Sep. 24, 2020

(65) Prior Publication Data
US 2022/0182556 A1 Jun. 9, 2022

(30) Foreign Application Priority Data
Mar. 20, 2019 (EP) .................... 19020136

(51) Int. Cl.
*H04N 23/90* (2023.01)
*H01S 3/00* (2006.01)
*H04N 23/698* (2023.01)

(52) U.S. Cl.
CPC ........... *H04N 23/90* (2023.01); *H01S 3/0071* (2013.01); *H04N 23/698* (2023.01)

(58) Field of Classification Search
CPC ...... H04N 23/90; H04N 23/698; H04N 23/74; H01S 3/0071
See application file for complete search history.

(56) References Cited

U.S. PATENT DOCUMENTS 7,577,285 B2 * 8/2009 Schwarz .............. B23K 9/0956
348/90
8,427,632 B1 * 4/2013 Nash ........................ G01C 3/08
348/136

(Continued)

FOREIGN PATENT DOCUMENTS

CN 104180769 A 12/2014
KR 20050011908 A 1/2005

(Continued)

OTHER PUBLICATIONS

International Search Report dated May 20, 2020 in corresponding International Application No. PCT/EP2020/025136 (3 pages).

*Primary Examiner* — Padma Haliyur
(74) *Attorney, Agent, or Firm* — Bookoff McAndrews, PLLC

(57) ABSTRACT

This invention is about an imaging system that uses conventional cameras and a single laser line to perform quality control at the output of a converting machine or a press. The system uses several cameras distributed over the width of the printed sheets. Thanks to the laser line, it can reconstruct the complete image of the printed matter even when the sheets are not perfectly flat or at varying height, compensating geometric as well as photometric distortions. The use of conventional cameras results in a cost effective system.

11 Claims, 6 Drawing Sheets

(56) References Cited

U.S. PATENT DOCUMENTS

| | | | |
|---|---|---|---|
| 10,041,786 B2* | 8/2018 | Wolff | G01B 11/2522 |
| 10,812,778 B1* | 10/2020 | Wang | G01B 11/0608 |
| 2011/0310399 A1* | 12/2011 | Keshavmurthy | G01B 11/2545 |
| | | | 356/604 |
| 2012/0204614 A1 | 8/2012 | Isei et al. | |
| 2014/0168482 A1 | 6/2014 | Herman et al. | |
| 2016/0084819 A1 | 3/2016 | Raunio et al. | |
| 2017/0023490 A1 | 1/2017 | Ahlen | |
| 2017/0140537 A1* | 5/2017 | Jia | H04N 13/204 |
| 2020/0137317 A1* | 4/2020 | Abbas | H04N 7/181 |

FOREIGN PATENT DOCUMENTS

| | | |
|---|---|---|
| KR | 100916615 B1 | 9/2009 |
| WO | 2004113831 A1 | 12/2004 |

\* cited by examiner

MULTI-CAMERA IMAGING SYSTEM USING A LASER LINE

CROSS-REFERENCE TO RELATED APPLICATION(S)

This application is a National Stage under 35 U.S.C. § 371 of International Application No. PCT/EP2020/025136, filed Mar. 18, 2020, which claims priority to European Patent Application No. 19020136.8, filed Mar. 20, 2019, the contents of all of which are incorporated by reference in their entirety.

FIELD OF THE INVENTION

The invention is in the field of imaging systems for quality control systems in machines that transport a web or sheets of material like paper or cardboard sheets.

TECHNICAL BACKGROUND

When using a printing or a converting machine, a series of individual sheets travel through the various units of the machine. In some machines a web replaces the individual sheets. To ensure proper quality, a control station may be placed at the end of the printing line. This quality control station consists of an imaging system that produces an image of the sheets. The images are checked by a control or inspection algorithm to determine whether the sheets meet the specifications. In other words, it checks for defects that might have occurred during the printing/converting process.

Today's systems may require the detection of small defects over wide sheets. Thus, several cameras are often necessary to check the quality of the whole sheets. The imaging systems from the state-of-the-art use fast linear cameras to capture the sheets. The cameras capture one line (or 2-3 lines) of the sheet at high speed, and thanks to the travelling of the sheet under the camera, they are able to capture the whole sheets (or the whole web, if a web is used).

If the sheet is not travelling under the cameras with the expected instantaneous speed, it will result in a deformation of the resulting image. This phenomenon cannot be detected by the linear camera itself.

Also, to limit the size of the linear camera sensor, the camera uses a projective optical system. Thus, if the sheet is not perfectly flat, i.e. its surface-to-sensor distance varies, it will result in a local variation of the image scale.

Nowadays, linear cameras are more expensive than two-dimensional cameras (using matrix shaped sensors) became cheaper than linear camera.

SUMMARY OF THE INVENTION

The present invention is about a method using two-dimensional cameras in the imaging system of the quality control station, thereby obtaining an inexpensive system that solves the above mentioned problems from the state-of-the art. The invention is also bout the imaging system enabling said method.

The imaging system (and method) is well adapted for a machine configured to transport a flat support, like a printer, a die cutter, a brail processing machine, and more generally a converting machine. The support takes either the form of individual sheets of material or the form of a web. The support top surface travels at a given height above a reference plane in the device (the plane may be a real surface or just a virtual plane when using a web). In principle, the support travels on the plane, and thus the height is equal to the support thickness. In practice, however, this height may be variable, for example, when a sheet is flying over the surface, or when the support is not perfectly flat.

The imaging system comprises a laser source that projects a laser line on a support surface. There are at least two cameras that record the support, arranged side-by-side (along the laser line) to capture the whole width of the support potentially. The laser line must be visible in each image to determine the height of the support along the line. Thanks to said height information, the images delivered by the cameras are combined/stitched into an image slice, which ideally represents the whole width of the support. The resulting image slice may be used for quality control. Thus, prior to the combination/stitching, a sub-region that does not contain the laser line is selected in each image and used in the combination/stitching operation. Please note that to output an image slice that accurately represents the whole width of the support, the field of views of the cameras must partially overlap. Also, for optimal precision, the height is needed because it affects the camera-to-support distance and thereby the reproduction scale of the support in the recorded image.

The imaging system may be constructed using more cameras than laser sources, or may be constructed using one laser source per camera, thereby resulting in modules that can be replicated along the width of the support.

By repeating the above mentioned capture of image slices, we may combine the slices to obtain an image of the whole support (or at least an image of the support whose height is larger than a single image slice). To do so, we may use the support speed available from the converting machine, or compute the support translation between two slices using a vertical overlap between the image slices (or a combination of both). To compute the support translation using the vertical overlap, we make sure that the support carries enough texture information, for example with a set of marks on the border or the support. We also oversample the capture of image slices compared to the (maximum) support speed, thereby ensuring that the image slices are not disjoint. By vertical overlap, we mean the overlap according to the direction of motion of the sheet. Since the illumination of the support may vary with the height, the method may advantageously correct the photometric information at every pixel. The correction is a function of the pixel coordinates and of the related support height.

The sub-regions used to construct an image slice do not contain the laser line, and thus the height measured along the line is not exactly equal to the height of said sub-regions. To take into account this phenomenon, we may advantageously use the height of the laser line stemming from former image capture to compute the height information in the sub-regions. We may also combine the heights of the laser lines stemming from several image captures.

BRIEF DESCRIPTION OF THE FIGURES

Embodiments of the present invention are illustrated by way of example in the accompanying drawings in which reference numbers indicate the same or similar elements and in which.

DETAILED DESCRIPTION OF THE INVENTION AND OF SOME OF ITS EMBODIMENTS

Figure 1:
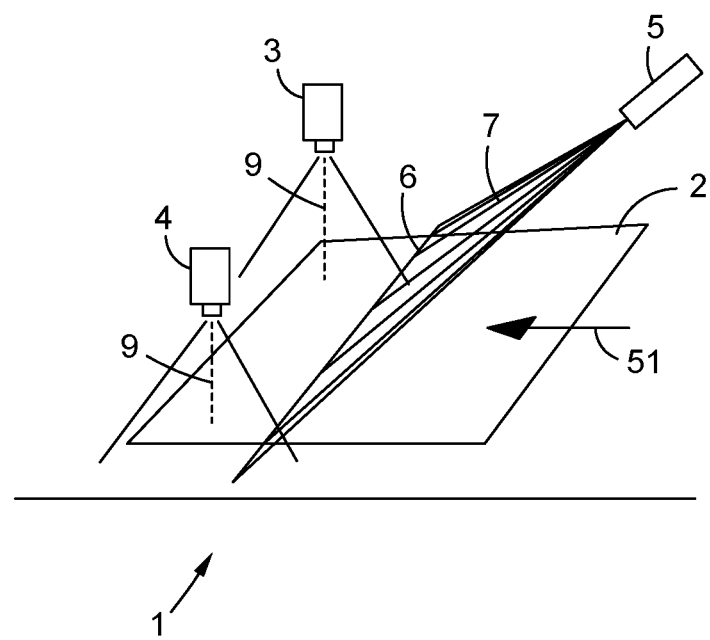
FIG. 1 shows an example of implementation of the imaging system using two cameras and a single laser source.

FIG. 1 shows an example of embodiment that uses two cameras 3,4 to capture the whole width of the sheet 2 under inspection. A laser source 5 projects a line 6 of light (the laser line) on sheet 2. The laser line is visible in the images taken by camera 3 and well as in the image taken by camera 4.

Please note that the plane of projection 7 of the laser has an angle compared to the optical axis 9 of the cameras. This results in the line shifting in the coordinate frame of the image captured by the camera when the height of the sheet varies. Thus, by measuring the location of the line in the image, and knowing the geometrical configuration of the camera and laser source, we can compute the height of the sheet along the line. In theory, the sheet should be flat. In practice, however, it may be curved or wavy. If the height of the top surface of the sheet changes, the (local) scale of the imaged surface changes also. Thus, to check for the exactitude of the printed matter on the sheet, or the exactitude of cut or creasing lines, this phenomenon must be compensated.

To compensate the scale variation due to height variations, the local height 8 of the sheet is measured along the laser line 6. We assume that the height does not vary along the direction of motion 51 of the sheet. Preferably, to simplify computation, the cameras 3,4 are oriented such that the laser line 6 appears horizontal on the image (for a perfectly flat sheet) and the direction of motion of the sheet 51 follows approximately the columns of the image. In this case, we get a height value for each column of the image. More generally, is suffices that the laser line be in a transverse direction compared to the direction of motion of the sheet (for examples with and angle ranging from 45 deg to 135 deg); the orientation of the image lines/columns compared to the above mentioned directions does not matter.

Figure 2:
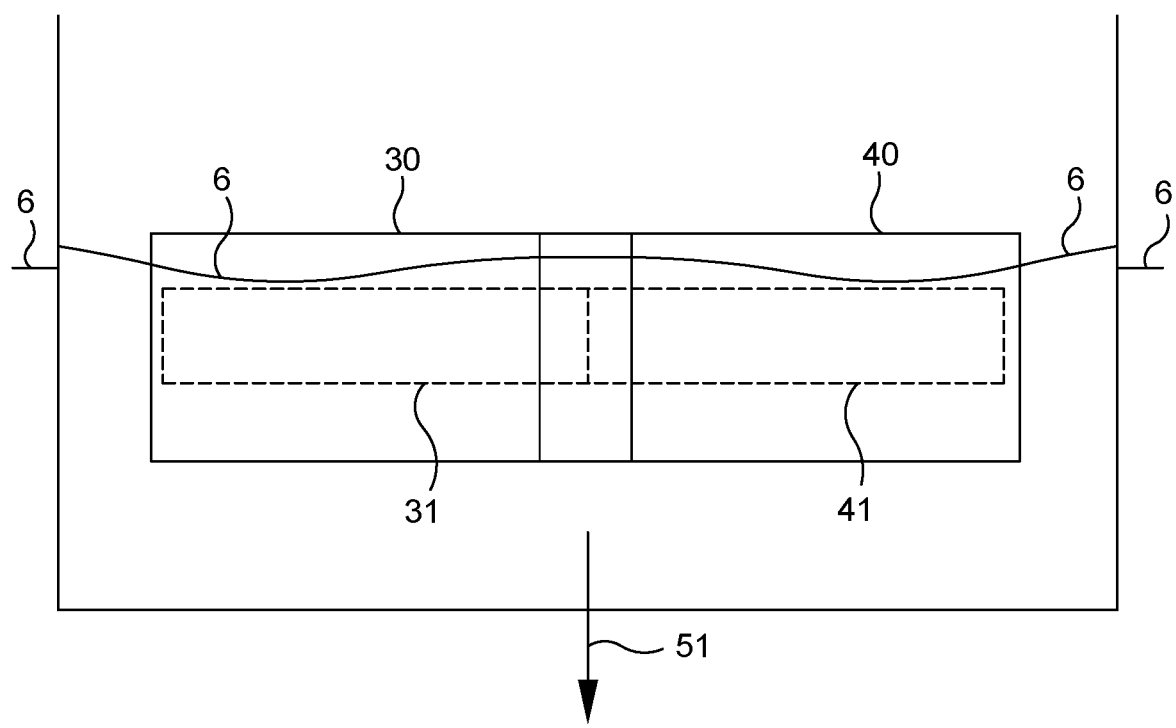
FIG. 2 shows the sheets, the laser line, the field of view and the field of inspection of the two cameras.
Figure 3A:
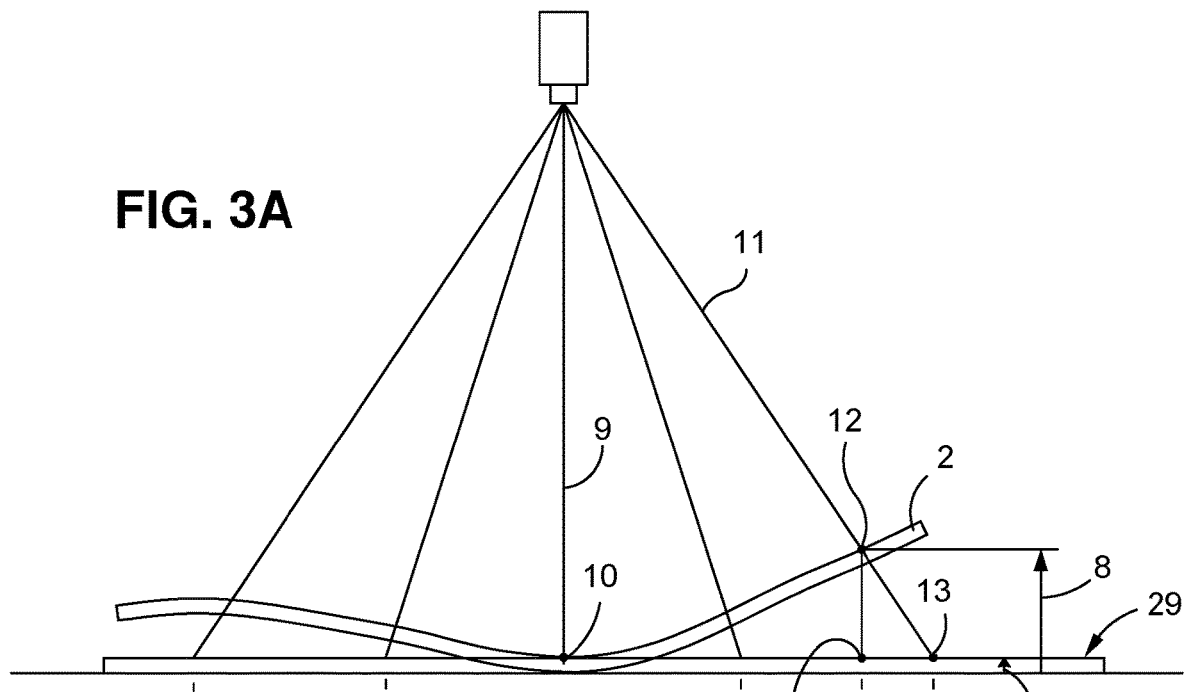
FIG. 3 shows the reinterpolation principle of a sheet with varying height toward the sheet on the reference height using an orthographic projection.
Figure 3B:
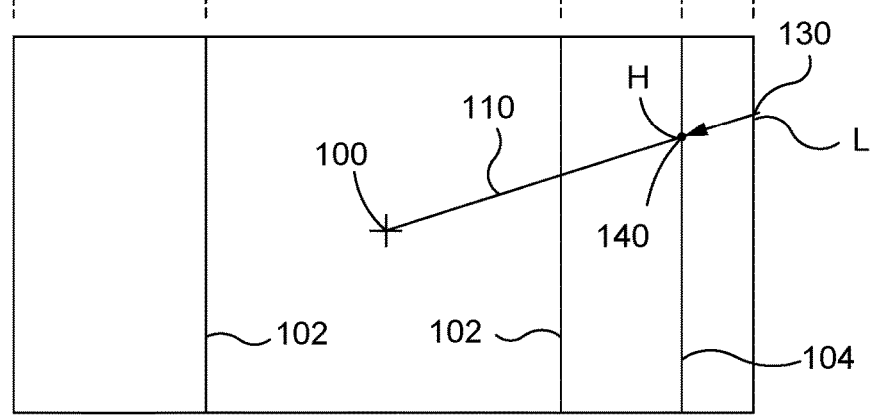

FIG. 2 shows the sheet seen from above, with the field of view 30,40 of cameras 3,4 respectively. Let's call the direction of motion of the sheet the motion direction 51 and the direction of the laser line (for a flat sheet) the transverse direction. The field of views of the cameras overlap slightly along the transverse direction (for example they may overlap by 5%, 10% or 20%; the overlap percentage may vary with the height of the sheet). The laser line 6 crosses the field of view of both cameras. For illustration purposes, the deviation of the laser line 6 from a straight line is exaggerated in the drawing. The camera have an inspection area 31, 41, which does not contain the laser line. The inspection area are used for imaging the sheet, and are stitched together along the transversal direction to form a single image at the output. The inspection area is either below or above the laser line, i.e. either before or after the laser line in the direction of motion of the sheet FIG. 3 shows how to recompute the image that correspond to a perfectly flat sheet given local height 8 of the sheet. In this example, two representations of the sheet are shown: one which is curved, corresponding to a real situation (with an exaggerated deformation) and one, on the ground, corresponding to the situation of reference. The choice of the reference height 88 is arbitrary, but may advantageously correspond to a typical situation. Here we assume that the reference sheet is a perfectly flat sheet with a surface 29 located at a predetermined height 88. FIG. 3B represents the image of the scene in FIG. 3A captured by the camera. The camera performs a projective projection, and thus point 12 and 13 in the scene are mapped to the same point 130 in the image (they are projected along direction 11 in the scene). To correct for scale, we virtually project the sheet on the reference height 29 in an orthogonal way (i.e. along the line of height 8), thereby obtaining the equivalent of an orthographic projection, for which the scale of the image does not change with the distance to the camera. Let's call the resulting image the reinterpolated image. For example, the point 12 is virtually projected on point 14. Point 14 appears at location 140 on the image. Thus, to obtain the image of the perfectly flat sheet, we take the pixel value at location 130 and shift it at location 140. Please note that the location 140 is the intersection of the line 110 joining the optical center 100 of the image and location 130 with the motion line 104 corresponding to the projection 14 of point 12. This process can be repeated for every point of the image; the transformation being determined by the local height, which is constant along the lines of motion 102,104 in the image. Generally speaking, in this example, the function is the mapping from the projective representation toward the orthographic representation, made possible by the measurement of the local height. In practice, we use the inverse of that function: for every location H of the reinterpolated image, we compute the transformation corresponding to a shift from location H to location L and fill the pixel (of the reinterpolated image) at location H with the pixel value at location L in the captured image (obtained by interpolation, since L might be in-between pixels). Thus, the reinterpolated image is a reinterpolation of the captured image corresponding to the image of a perfectly flat support (sheet) captured at a pre-established height. The reinterpolated image is computed for every camera; the reinterpolated images are stitched together resulting in a common and wider stitched image, used as output for further processing (for example for quality control). The inspection area is defined at the reference height 29, thereby ensuring a proper coverage of the whole sheet width. (the width of the sheet being defined perpendicularly from the motion direction). Please note that we ignored any compensation of the optical distortions that are corrected thanks to a prior camera calibration step, which is fairly standard and outside the scope of this disclosure.

Because the height variations are small in practice, the image of a straight line printed on the support maps into a straight line in the stitched image. Also, thanks to the orthographic representation, there are not discontinuities on the line at the junction points between the reinterpolated images used to construct the stitched image.

Figures 4A, 4B:
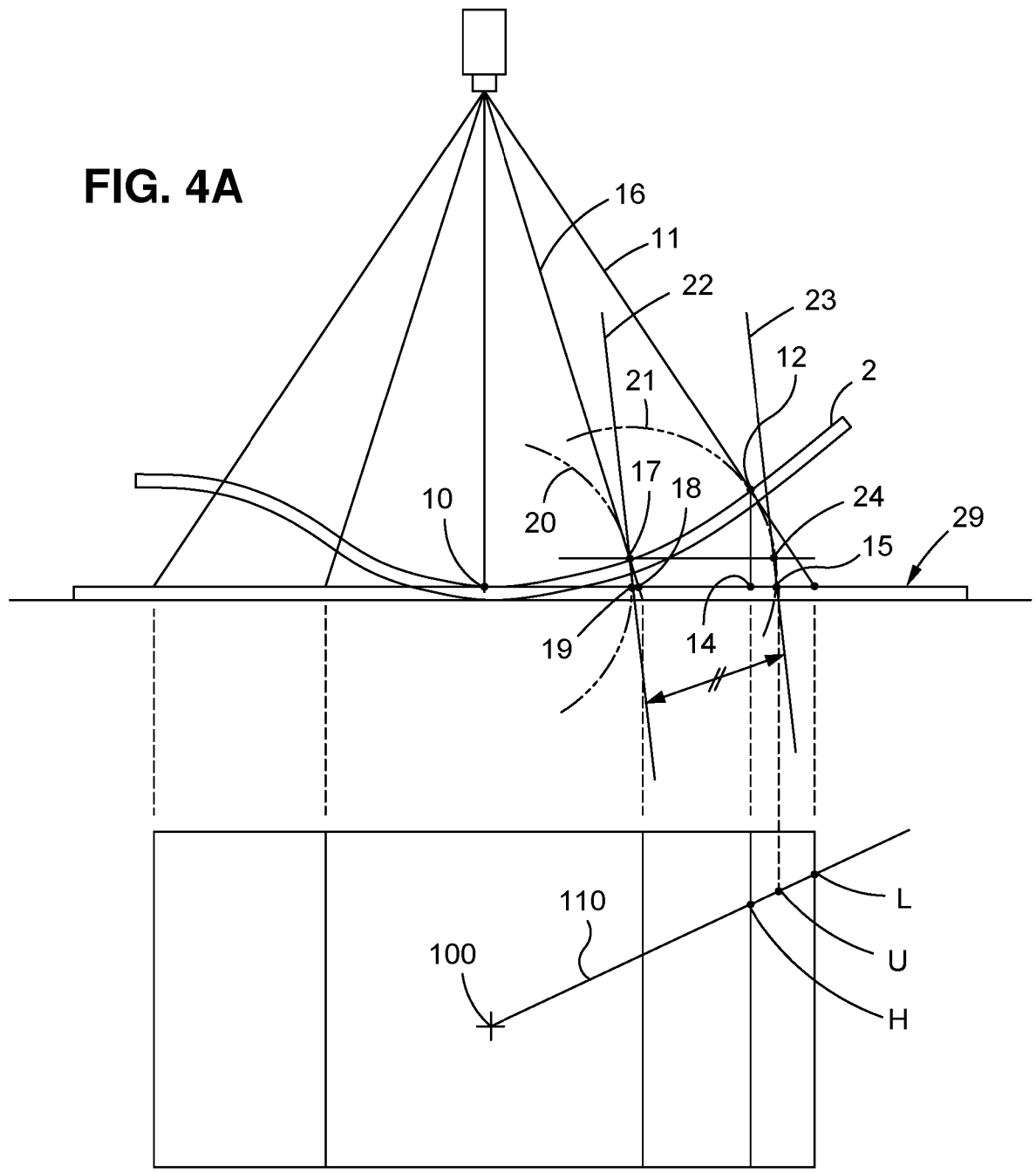
FIG. 4 shows the reinterpolation principle of a sheet with varying height toward the sheet on the reference height using unfolding of the sheet.
Figure 4C:
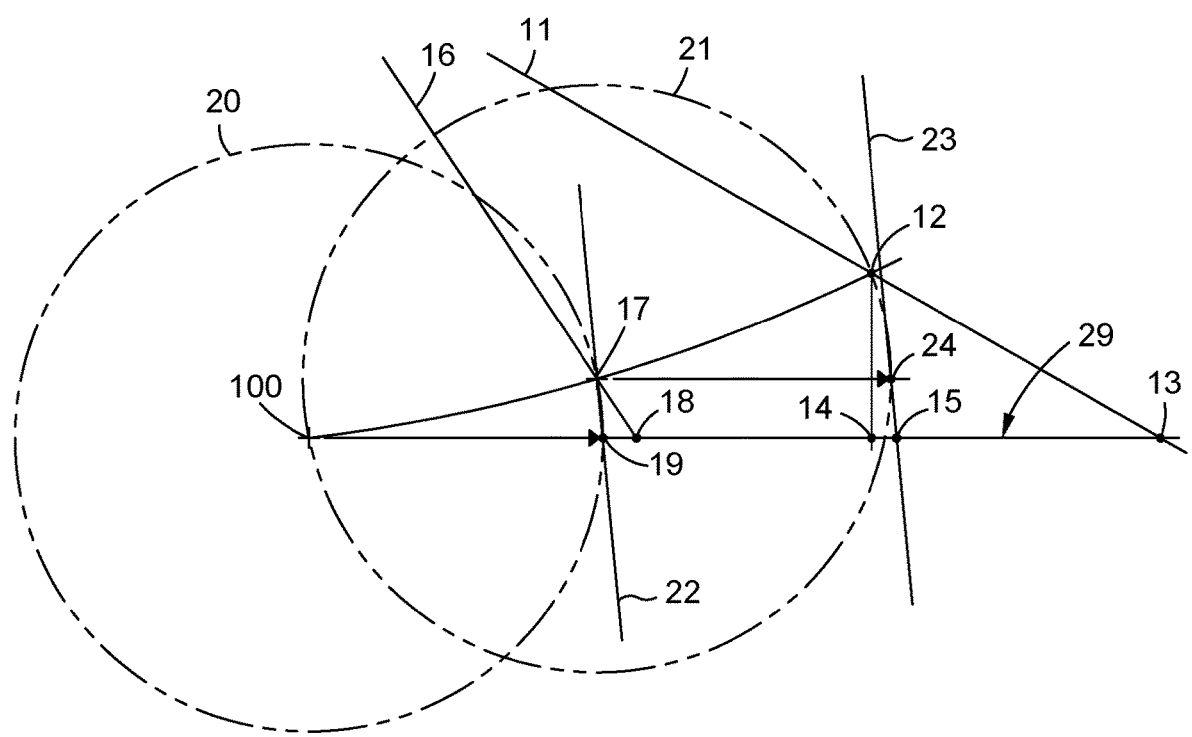

As an alternative, which is slightly more precise but computationally more intensive, one might virtually unfold the sheet (from the optical center toward the edge) instead of doing an orthographic projection. This method is shown in FIG. 4. Instead of projecting point 12 vertically on point 14, the sheet is unfolded, resulting in projecting point 12 onto point 15. To do so, the unfolding begins at the optical center 10. It start by projecting point 17 that corresponds to the next point where a height value is available. Point 17 is projected along a (circular) arc 20 centered around point 10. Point 17 is projected onto the ground 29, resulting in point 19 (we assume that point 10 is on the reference height 29 here, for the sake of the simplicity of the explanation). Please note the difference between the line 22 joining point 17 and 19 and line 16 which follows the natural projective rays of the camera (thus point 17 and 18 would appear on the same location in the captured image). FIG. 4C shows a zoom of the operation or FIG. 4A. The next point 12 is projected using an arc centered around point 17. Point 12 is projected onto point 24 which is at the same height than point 17. The projection 14 is obtained by projecting point 24 along a parallel 23 to line 22. The computation is repeated for every height value along the laser line and applied to every pixel of the inspection area resulting in a reinterpolated image. The interpolation process is that same as in the example of FIG. 3, the difference lying in the coordinate computation.

The imaging device disclosed here is suitable for printing or converting machines. For example, it can be placed at the output of a printing machine or at the output of a platen press. The imaging device is coupled with a transport system that translates the sheet under the imaging device, and transmits the translation information to the imaging device. Depending on the machine, the maximum support (or sheet) width can vary, and thus requires a different number of cameras. For example, narrow machines might be equipped with two cameras, while wider machines might be equipped with 3 to 9 cameras along the transversal direction.

Advantageously, instead of having a single laser source for many cameras, one can choose to have a laser source for each camera. This allows constructing a combined camera and laser source module that can be replicated to cover the whole sheet width, thereby ensuring a quality which is independent of the maximum support width. This is also advantageous from a production and calibration logistic. The method to compute the height of the sheet remains the same.

Advantageously, in addition to the geometric reinterpolation of the inspection area as described above, we may correct the photometric information for each pixel of the inspection area. When the height of the support varies, the distance to the illumination use to light the support and the distance to the camera varies. This results in a change of the perceived brightness by the camera. In other words, the same support section will result in a difference pixel value if the height changes. To compensate for this phenomenon, we record an image of a reference flat surface, with constant reflectivity at two different heights: the top height and the bottom height (for example at the minimum and at the maximum expected height). Then, for each pixel of the two reference images, we compute a correction factor (for each color of the image) to map the recorded pixel value onto a single reference value (corresponding to the constant reflectivity of the reference support). This results in two images made of correction factors (instead of colour values). Lets call these images the brightness factor images. When a new image of the support surface is recorded, we compute the height of the support surface for every pixel location and compute a correction factor by interpolating the values from the top brightness factor image and the values from the bottom factor image, based on the pixel height compared to said bottom and top height. In practice, this is an interpolation based on a three-dimensional coordinate applied to every colour channel of the image. This correction corrects for the variation of illumination caused by the support surface height, but also corrects for other phenomena like camera vignetting or illumination non-uniformities.

Please note that we may record the reflectivity of the reference flat surface at more than two heights and interpolate in-between to get a correction with a better precision. We found however that, given our illumination setup, two measurements suffice.

Figure 5:
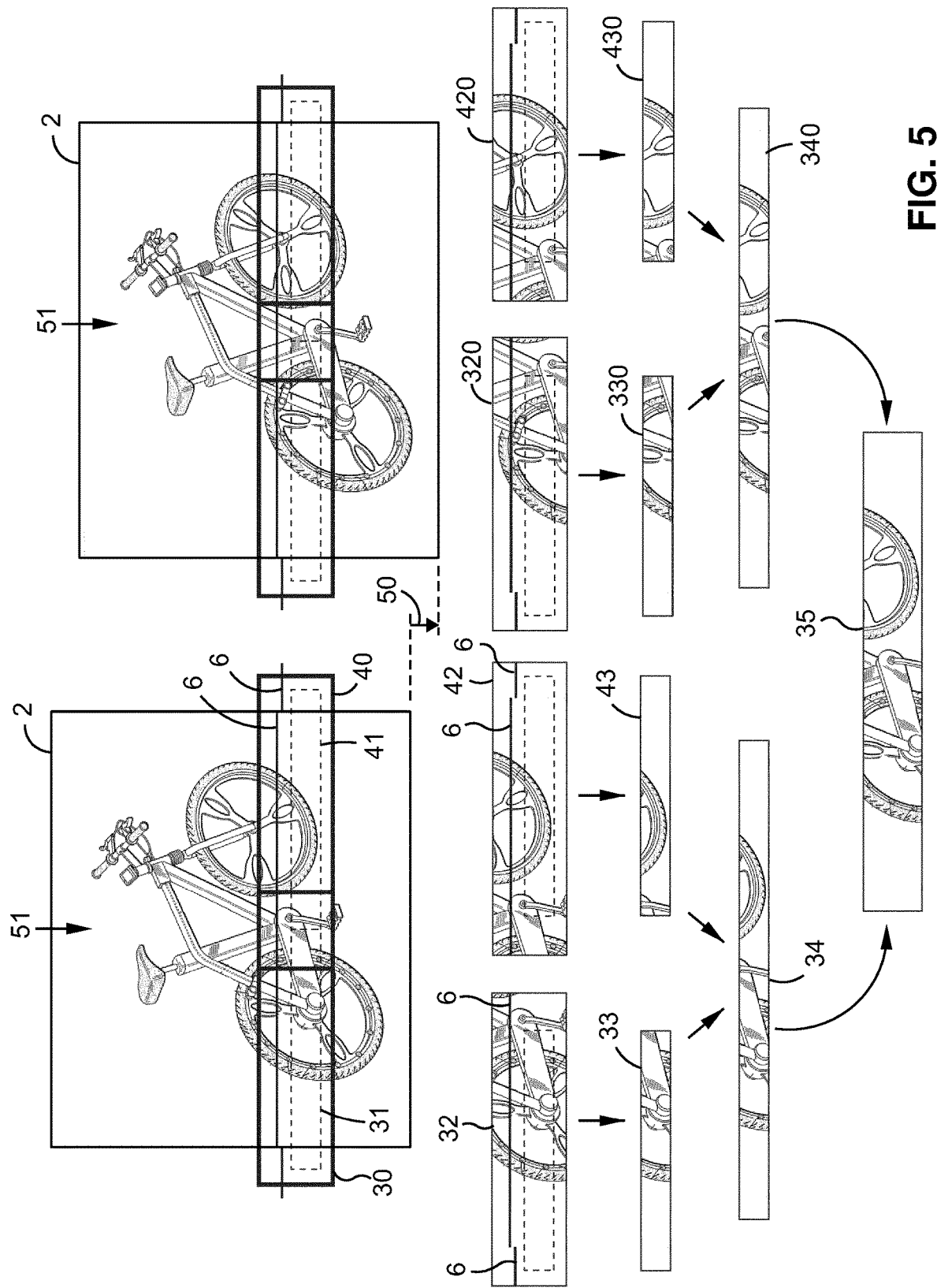
FIG. 5 shows an example of the reconstruction of the image of a bike printed on the sheet by a system with two cameras.

FIG. 5 illustrates the capturing process of the imaging system. The left picture shows a sheet picturing a bicycle being captured by the imaging system. The right picture, shows the same sheet an instant later, at the next capturing instant of the imaging system. The example shows an imaging system with two cameras. The left camera has a field of view 30 and a field of inspection 31. The right camera has a field of view 40 and a filed of inspection 41. The picture shows the image 32 taken by the left camera and the picture 42 taken by the right camera. The pictures contain the image of the laser line 6. Then the images are reinterpolated into picture 33 and 43 and assembled into the stitched picture 34. The process is repeated an instant later and shown on the right of the picture. The stitched pictures 34, 340 taken at different moments are combined/stacked into a reconstructed image 35. The stacking is repeated to obtain an image of the complete sheet 2. Strictly speaking, we do not need necessarily the complete height of the sheet: we just need to be high enough for the subsequent quality control operation. The capturing frequency of the pictures is synchronized with the motion 50 of the sheet. When done properly, the resulting reconstructed image does not show any gaps nor any repetitions compared to the image/motif present on the support (sheet).

Please note that the height of the laser line used to reinterpolate the pictures prior to stitching may be the one stemming from the same picture. However, we use preferably the one of a former picture. In practice, we store the height information until the part of the sheet lit by the laser reaches the inspection area. For example, in FIG. 5, we use the height information recorded by the configuration depicted on the left (recorded at time T-1) and apply it to the images on the right of the figure (recorded at time T). Indeed, on the left of the figure, the laser line touches the top of the bicycle drive shown on the sheet, while on the right of the figure, the same top of the bicycle drive is centered in the inspection area. Please note that we could also take any values in-between two lines, or use two lines: one above the inspection area, one below, and interpolate the height information inbetween the two lines, thereby obtaining a height value for every pixel of the inspection area.

Figure 6:
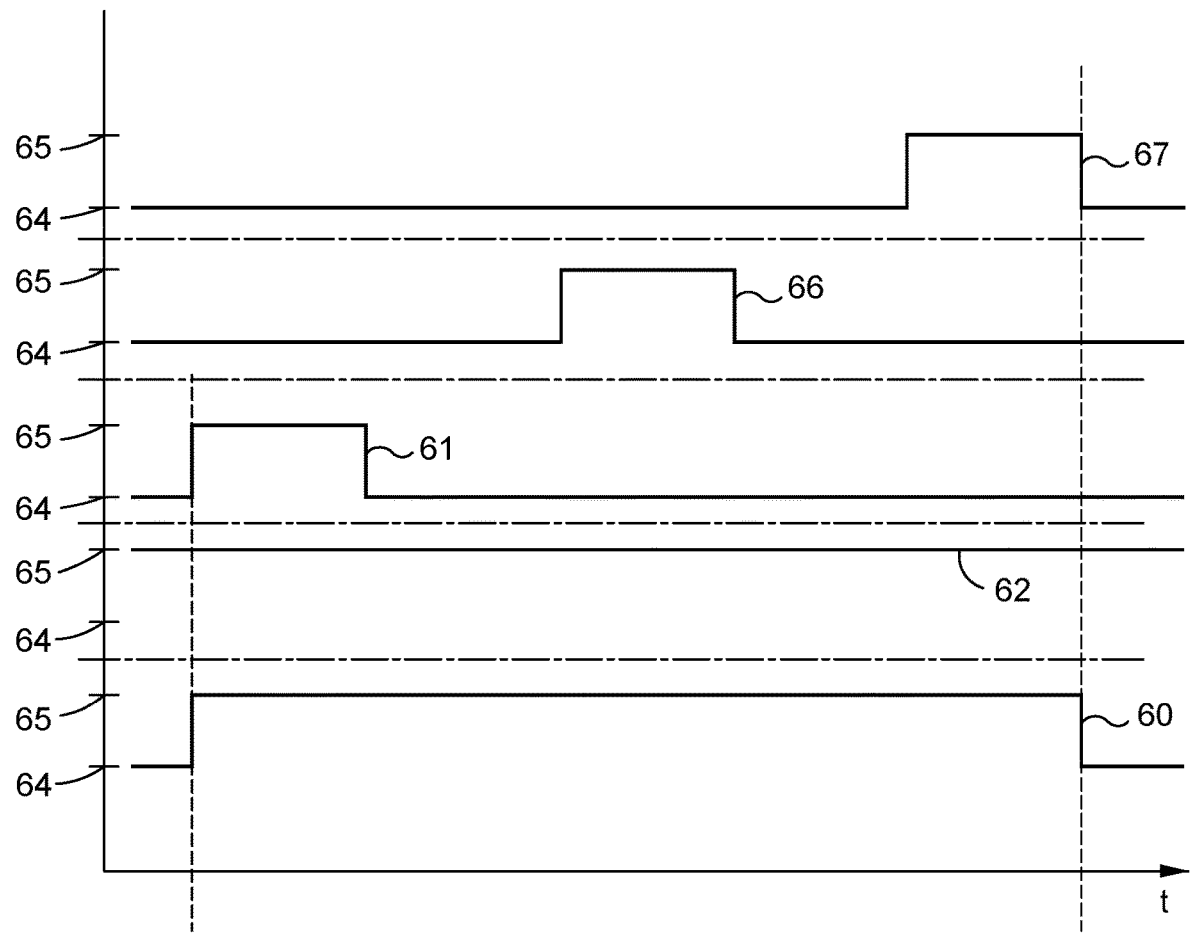
FIG. 6 shows several examples of exposure timing of the camera, illumination and laser line.

To have an image of the laser which is visible for any reflectivity of the support surface, one may want to expose differently the inspection area and the laser line. The exposure time of the inspection area should be kept short. Indeed, the support should not move by more than a fraction of pixel during exposure to avoid motion blur. By exposure time of the inspection area we mean the time where the camera is "open" (i.e. recording the picture) and the inspection area is lit by the illumination device. In practice we keep the camera exposure time longer than the "flash" exposure time, i.e. the time between the moment where the illumination is turned ON and tuned OFF (here we consider the flash exposure during the exposure of the image, if the flash is ON after the end or the exposure, or ON before its beginning, we do not count it). The exposure time of the inspection area being the time where the flash is ON and the camera is open. The exposure time of the laser line is not bound by the same constraint (the exposure time of the laser line being the time where the laser is ON and the camera is open). If the support moves during exposure, it does not matter, as long as the height of the support does not change during exposure (i.e. the support can move by more than a pixel without problem). Thus, to ensure that the laser line is visible while using less power in the laser (thereby saving cost in the equipment), the exposure time of the laser line is chosen to be longer than the exposure time of the inspection area. FIG. 6 shows an example of exposure timing. The exposure of the camera is shown by line 60, the exposure of the illumination (i.e. the "flash") is shown by line 61 and the exposure of the laser by line 62. The position 64 represents the OFF or closed position, while the position 65 represents the ON or open position. The exposure time of the laser line can be 5 to 20 times longer than the flash exposure time, for example 10 times longer. For example, the exposure time of the camera (60) can be set to 800 microseconds while the flash exposure time (61,66,67) can be set to 80 microseconds. The laser line may be always on, like in the example of FIG. 6, or synchronized (or approximately synchronized) with the exposure 60 of the camera. The ON/OFF exposure profiles 66 and 67 of the illumination represent equivalent alternatives to the example ON/OFF exposure profile 61. The abscissa of FIG. 6 represents the time.

Please note that by using picture 32 and comparing it with picture 320, taken an instant later, one can compute the motion of the sheet using some image processing algorithms using the overlap between the pictures. The result of the computation can be used to verify that the translation of the sheet 50 goes according to specifications. Preferably, the sheet may have some marks printed on the border to ensure the robustness of such an approach. Also, said motion computation may be used to properly combine image slices, in case the motion of the support is non-uniform or different from expected.

Please also note that the invention disclosed in this document is also useful for perfectly flat supports with varying height. As soon as the height is different from the reference height 29, the reinterpolation performs the correction for scale.

The imaging system disclosed in this document can for example be applied to acquire images at the output of the die-cutting machine where the individual sheets tend to "fly" at a loosely controlled height.

Please note that we invariably use "sheet" or "support" to designate the same object. We talk about "individual sheet(s)" if we want to emphasize the fact that the support comes in sheets.

The invention claimed is:

1. An imaging system for a device configured to translate a flat support over a reference plane in a direction of motion, at a height over the reference plane, the imaging system comprising:
a laser source configured to project a laser line on a surface of the flat support, the laser line being in a transverse direction compared to the direction of motion;
a processor; and
two cameras having overlapping fields of view arranged along the laser line,
wherein each camera is configured to capture an image of the surface of the flat support comprising the laser line, and
wherein the processor is configured:
to compute, for each image, a height of the surface of the flat support along the laser line using a position of the laser line within the image,
in each image, to select a sub-region before or after the laser line according to the direction of motion,
to use the computed heights to combine overlapping or adjacent sub-regions together into a common image slice, and
to output the image slice.

2. The imaging system of claim 1, wherein a number of the laser sources is the same as a number of the cameras, and
wherein each camera is configured to capture a respective laser line for computing the height of the surface of the flat support along the laser line.

3. The imaging system according to claim 1, wherein the imaging system is configured to synchronize the capture of the images with the translation of the flat support, thereby combining the image slices captured at different times into a single reconstructed image, and
wherein the system is configured to output the reconstructed image.

4. The imaging system according to claim 1, further comprising:
an illumination device configured flash the flat support, wherein a duration of the flash is configured to be shorter than an exposure time of the cameras.

5. A method for merging images stemming from several cameras, for a device with a flat support translating over a reference plane in a direction of motion, at a height over said the reference plane; the method comprising:
projecting a laser line on a surface of the flat support in a transverse direction compared to the direction of motion by using a laser source;
for each camera:
capturing an image of the surface of the flat support including the laser line,
using a position of the laser line within the image to compute the height of the surface of the flat support along the laser line,
selecting a predetermined area in the image before or after the laser line according to the direction of motion, and
re-interpolating the selected area into a representation corresponding to an image of a perfectly flat support captured at a pre-established height; and
joining the selected areas into an image slice by joining the selected areas side-by-side.

6. The method according to claim 5, wherein the re-interpolating further comprises interpolating a photometric correction based on coordinates of the image along the surface of the flat support and based on the height of the surface of the flat support along the laser line.

7. The method according to claim 5, further comprising:
synchronizing the capturing of the images with the translation of the support and combining the resulting image slices into a common reconstructed image representing the flat support without any gaps or repetitions.

8. The method according to claim 5, wherein the re-interpolating uses the height of the surface of the flat support along the laser line captured by the same camera at a different time.

9. The method according to claim 5, wherein the translating of the flat support is measured by comparing a content of consecutive and overlapping images captured by at least one of the cameras.

10. The method according to claim 9, further comprising outputting the translation measurement.

11. The method according to claim 5, further comprising:
flashing the flat support with an illumination device while capturing an image of the support,
wherein, during an exposure of the image, a duration of the flash is shorter than a duration of an illumination of the laser line.

\* \* \* \* \*